US008775709B2

(12) United States Patent
Lu et al.

(10) Patent No.: US 8,775,709 B2
(45) Date of Patent: Jul. 8, 2014

(54) METHOD FOR RECOGNIZING A CARD READER WITH MULTIPLE CARD HOLDERS AND METHOD FOR COMMUNICATING BETWEEN A HOST AND THE CARD READER AND SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 513 days.

(21) Appl. No.: 13/059,538

(22) PCT Filed: Oct. 28, 2010

(86) PCT No.: PCT/CN2010/078215
§ 371 (c)(1),
(2), (4) Date: Feb. 17, 2011

(87) PCT Pub. No.: WO2011/050740
PCT Pub. Date: May 5, 2011

(65) Prior Publication Data
US 2011/0197007 A1 Aug. 11, 2011

(30) Foreign Application Priority Data

Oct. 30, 2009 (CN) .......................... 2009 1 0236989
Oct. 30, 2009 (CN) .......................... 2009 1 0236990

(51) Int. Cl.
*G06F 13/00* (2006.01)
(52) U.S. Cl.
USPC ........................................ 710/300; 710/301
(58) Field of Classification Search
USPC ................................................ 710/300–306
See application file for complete search history.

(56) References Cited

U.S. PATENT DOCUMENTS

| 5,875,339 | A  | * | 2/1999  | Molnar et al. | ................ 710/240 |
| 6,182,204 | B1 | * | 1/2001  | Nakashima    | ..................... 712/38  |
| 6,381,662 | B1 | * | 4/2002  | Harari et al. | .................. 710/301 |
| 6,477,605 | B1 | * | 11/2002 | Taki et al.   | ..................... 710/302 |
| 6,898,653 | B2 | * | 5/2005  | Su et al.     | ....................... 710/302 |

(Continued)

FOREIGN PATENT DOCUMENTS

| CN | 2424494 Y   | 3/2001 |
| CN | 101013406 A | 2/2007 |

(Continued)

*Primary Examiner* — Nimesh G Patel
(74) *Attorney, Agent, or Firm* — Fay Sharpe LLP

(57) ABSTRACT

The present invention discloses a method, related to smart card reader field, for recognizing a card reader with multiple card holders. The method includes connecting, by the card reader with multiple card readers, to a host and loading, by the host, card reader device bus driver; obtaining, by the card reader device bus driver, the device information of the card reader with multiple card readers and creating physical device object according to the device information; installing and loading, by the host, smart card function driver for each physical device object and registering a standard smart card driver library for every smart card function driver; creating, by the smart card service of the host, a new smart card device record in the resource manager of the smart card service according to the smart card function driver loaded and the smart card driver library registered and recognizing the card reader with multiple card readers as a plurality of smart card devices. The invention further discloses a method for communicating between the host and the card reader with multiple card holders based on the recognizing method described above and a system thereof.

18 Claims, 5 Drawing Sheets

(56) References Cited

U.S. PATENT DOCUMENTS

| | | | |
|---|---|---|---|
| 7,114,157 B2 * | 9/2006 | Chaffee et al. | 718/104 |
| 7,191,275 B2 * | 3/2007 | Arackal et al. | 710/302 |
| 7,454,549 B2 * | 11/2008 | Chari et al. | 710/302 |
| 7,484,025 B2 * | 1/2009 | Son et al. | 710/301 |
| 7,578,446 B2 | 8/2009 | Yen | |
| 7,620,844 B2 * | 11/2009 | Mambakkam et al. | 714/6.12 |
| 7,899,970 B2 * | 3/2011 | Mori | 710/313 |
| 8,046,508 B2 * | 10/2011 | Leaming | 710/62 |
| 8,086,778 B2 * | 12/2011 | Herskedal et al. | 710/301 |
| 8,209,528 B2 * | 6/2012 | Rogers et al. | 713/2 |
| 2005/0092844 A1 | 5/2005 | Zhang et al. | |
| 2007/0067538 A1 * | 3/2007 | Okamoto et al. | 710/301 |
| 2007/0180177 A1 * | 8/2007 | Jones et al. | 710/301 |
| 2007/0288677 A1 * | 12/2007 | Mambakkam et al. | 710/301 |
| 2009/0259772 A1 | 10/2009 | Ketko et al. | |

FOREIGN PATENT DOCUMENTS

| | | |
|---|---|---|
| CN | 101018131 A | 8/2007 |
| CN | 200947210 Y | 9/2007 |
| CN | 101169819 A | 4/2008 |
| CN | 101699416 A | 10/2009 |

* cited by examiner

METHOD FOR RECOGNIZING A CARD READER WITH MULTIPLE CARD HOLDERS AND METHOD FOR COMMUNICATING BETWEEN A HOST AND THE CARD READER AND SYSTEM THEREOF

FIELD OF THE INVENTION

The present invention relates to IC card reader field, and more particularly, to a method for recognizing a card reader with multiple card holders and a method for communicating between a host and the card reader with multiple card holders and a system thereof based on the identification method.

BACKGROUND OF THE INVENTION

Integrated Circuit card (IC card) is a new type of information tool after the appearance of the magnetic card. A microelectronic chip is embedded in a card complied with ISO 7816 standard to form an IC card. At present, the IC card has been wildly used in many fields such as finance, traffic and social insurance, etc. For example, the traffic card for bus transportation is a kind of IC card.

IC card reader, which is called Interface Device (IFD) in the ISO international standard, is a bridge between the IC card and application system. Generally, the IC card communicates with the IFD by Radio Frequency (RE) technology. That is, the CPU of the IFD connects to and communicates with the IC card via an interface circuit. Thereby, the interface circuit is a very important part of the IC card reader. According to the actual application system, different IC card chips can be selected, such as the IC card with parallel communication, half duplex serial communication or I2C communication.

During the development of the present invention, the inventor finds at least the following weakness of the prior art: When an IC card reader has multiple card holders, the host cannot identify such an IC card reader. As a result, the data communication and the instruction reception/transmission between the host and the card reader can not be realized.

SUMMARY OF THE INVENTION

In order make a host to identify a card reader with multiple card holders, the embodiment of the invention provides a method for recognizing a card reader with multiple card holders and a method for communicating between a host and a card reader based on the recognizing method and a system thereof.

A method for recognizing a card reader with multiple card holders, comprising:
  connecting, by the card reader with multiple card holders, to a host and loading, by the host, a card reader device bus driver;
  obtaining, by the card reader device bus driver, device information of the card reader with multiple card holders and creating a physical device object according to the device information;
  installing and loading, by the host, a smart card function driver for each physical device object and registering a standard smart card driver library for each smart card function driver;
  creating, by a smart card service of the host, a new smart card device record in the resource manager of the smart card service according to the smart card function driver loaded and the smart card driver library registered and recognizing the card reader with multiple card holders as a plurality of smart card devices.

A method for the communication between the host and the card reader with multiple card holders based on the method for recognizing a card reader with multiple card holders above, comprising:
  generating, by the smart card function driver, a smart card operating instruction according to the smart card operating request sent from an upper application;
  applying, by the smart card function driver, for a mutex;
  if the mutex application is not successful, suspending the smart card operating instruction and waiting for a successful application;
  if the mutex application is successful, sending, by the smart card function driver, the smart card operating instruction to the card reader device bus driver; issued by the card reader device bus driver, the smart card operating instruction to the card reader with multiple card holders; executing, by a corresponding smart card in a card holder of the card reader with multiple card holders, the smart card operating instruction received and returning the executing result; receiving, by the card reader device bus driver, the executing result and reporting the result to the upper application and releasing the mutex; generating, by the smart card function driver, a smart card operating instruction according to the smart card operating request sent from the host and sending the smart card operating instruction to the card reader with multiple card holders via smart card device bus driver;
  determining, by the firmware program of the card reader, whether the hardware resource of the card reader is occupied at present;
  if it is occupied, suspending the smart card operating instruction and waiting for the releasing of the hardware resource;
  if it is not occupied, issued by the card reader, the smart card operating instruction to the corresponding card holder; executing, by the smart card in the corresponding card holder, the smart card operating instruction and returning the executing result; receiving, by the card reader bus driver, the executing result and reporting the executing result to the upper application.

A communicating system between a host and a card reader with multiple card holders, comprising: a host and a card reader with multiple card holders;
  the host includes:
  a loading module adapted to load card reader device bus driver when the card reader with multiple card holders is connected to the host;
  an obtaining module adapted to obtain device information of the card reader with multiple card holders via a card reader device bus driver;
  a creating module adapted to create physical device object via the card reader device bus drive according to the device information;
  an installing module adapted to install and load smart card function driver for each physical device object;
  a registering module adapted to register a standard smart card driver library for each smart card function driver;
  an recognizing module adapted to, via the smart card service of the host, create a new smart card device record in the resource manager of the smart card service and identify the card reader with multiple card holders as a plurality of smart card devices according to the smart card function driver loaded and the smart card driver library registered;

an instruction generating module adapted to generate smart card operating instruction via the smart card function driver according to the smart card operating request sent by the host;

a sending module adapted to send the smart card operating instruction to the card reader with multiple card holders via the smart card function driver;

a receiving module adapted to receive the executing result of the smart card operating instruction via the card reader device bus driver and reports the executing result to an upper layer application;

the card reader with multiple card holders includes:

a determining module adapted to determine whether the hardware resource of the card reader is occupied at present via the card reader firmware program of the card reader with multiple card holders;

a suspending module adapted to suspend the smart card operating instruction and wait for the release of the hardware resource when the determine module determines that the hardware resource of the current card reader is occupied;

a receiving and sending module adapted to issue, by the card reader, the smart card operating instruction to the card holder in the operating instruction of the smart card when the determining module determines that the hardware resource of the current card reader is not occupied.

The advantageous effects resulted from the above technical solution are:

1) according to a method for recognizing a card reader with multiple card holders, the card reader with multiple card holders can be identified as a plurality of smart card device, and the host may monitor status changes of every card of the smart card device and the card reader with multiple card holders may supports the situation that a card reader with card holders of same type or different types, and make the plural of card holders of the card reader share one communication bus and the plural card holders of the card reader can perform data communication and sending/receiving instruction by using one communication channel alternatively or mutual exclusively;

2) according to the technical solution of method for communication between a host and a card reader with multiple card holders, due to a card reader with multiple card holders can be identified as a plurality of smart card devices and the host may monitor status changes of every card of the smart card device, and the card reader with multiple card holders may supports the situation that a card reader with card holders of same type or different types, and make the plural of card holders of the card reader share a communication bus and the plural card holders of the card reader can perform data communication and sending/receiving instruction by using one communication channel alternatively or mutual exclusively;

3) according to the technical solution of a communication system, it may support the case that a card reader with multiple card holders with same type or different types and the plural card holders of the card reader share one communication bus and the plural card holders of the card reader can perform data communication and sending and receiving in n alternatively and mutual exclusively by using the communication channel.

DETAILED DESCRIPTION OF THE INVENTION

Objects, technical solutions and advantages of the invention will be easily understood by reference to the following description of embodiments when read in conjunction with the accompanying drawings.

Embodiment 1

Figure 1:
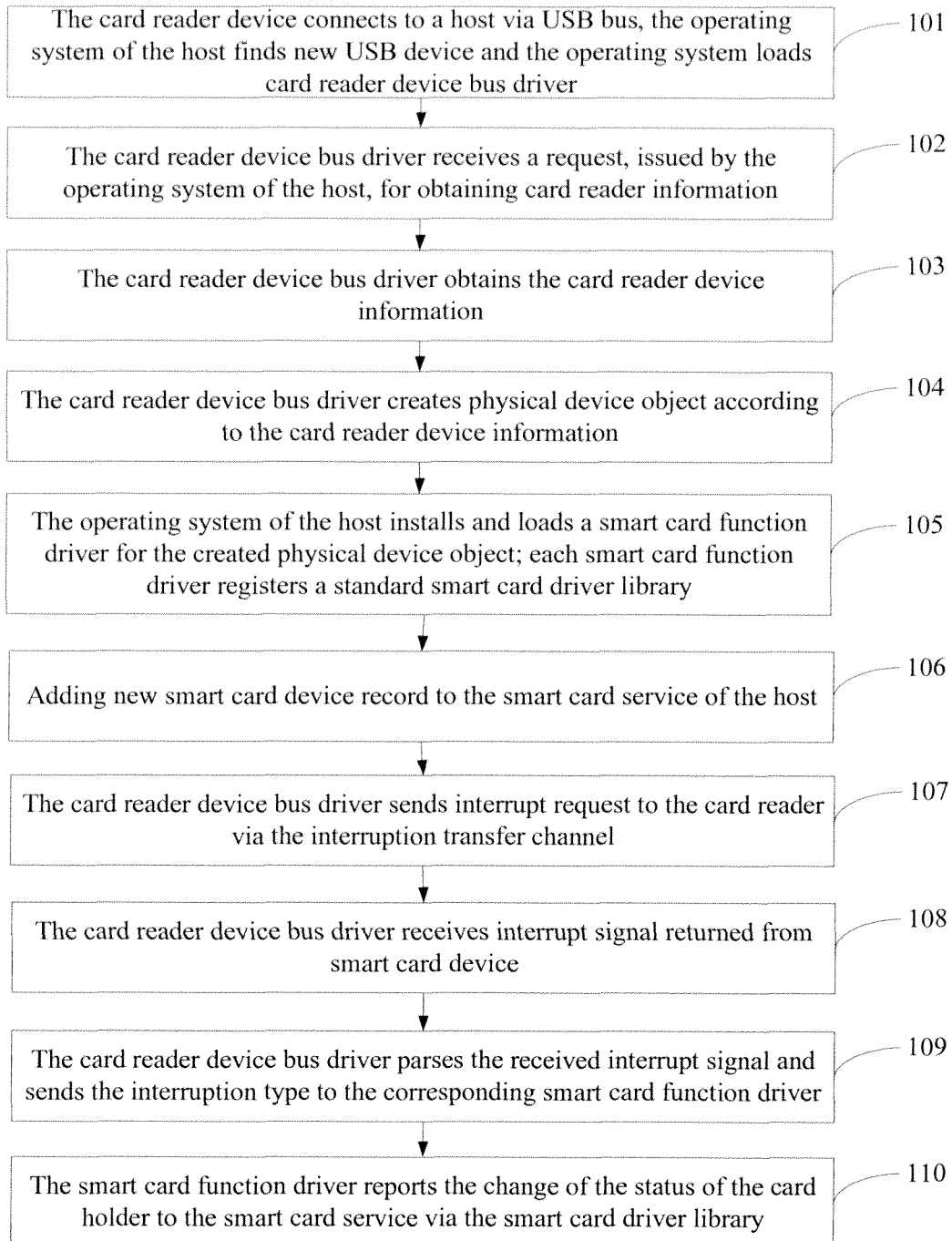
FIG. 1 is a flow chart illustrating a method for recognizing a card reader with multiple card holders provided by Embodiment

Embodiment 1 provides a method for recognizing a card reader with multiple card holders. It should be noted that the IC card reader provided by the embodiment 1 has at least two card holders. Referring to FIG. 1, the method includes:

Step 101: the card reader device connects to a host via USB bus, the operating system of the host finds new USB device and the operating system loads card reader device bus driver;

after the card reader device connects to the host, data communication and instruction sending/receiving are performed according to the USB Chip/Smart Card Interface Devices (CCID) protocol via USB bus.

Step 102: the card reader device bus driver receives a request, issued by the operating system of the host, for obtaining card reader device information;

thereby, the operating system of the host may issue the inquiry request to the card reader device bus driver via Plug and Play Manager for obtaining card reader device information.

Step 103: the card reader device bus driver obtains the card reader device information;

Specifically, the step may includes following steps:

(1) the card reader device bus driver responses to the inquiry request of the operating system, and generates and sends request instruction to the card reader and obtains the device descriptor of the device.

(2) in the device descriptor returned by the card reader, a single character is used to indicate the type of the card holder, that is, the number of the characters contains in the device descriptor represents the number of the card holders of the card reader; for example, if the device descriptor returned from the card reader is A, it indicates that the card reader has only one card holder and the type of the card holder is type A; if the descriptor returned from the card reader is ABAC, it indicates that the card reader has four card holders, e.g. the type of No. 1 card holder is type A, the type of No. 2 card holder is type B, the type of No. 3 card holder is type A and the type of No. 4 card holder is type C. In the present embodiment, take example for the descriptor returned by the card reader is CCS, it indicates that the card reader in the present embodiment has three card holders, the type of No. 1 card holder is type C, the type of No. 2 card holder is type C and the type of No. 3 card holder is type S.

Step 104: the card reader device bus driver creates physical device object according to the card reader device information;

After that the card reader device bus driver obtains the descriptor returned by the card reader, the card reader device bus driver creates corresponding physical device objects corresponding to the card holders of the card reader respectively according to the type and number of the card holders indicated in the device descriptor.

Taking example for that the device descriptor returned from the card reader is CCS, the card reader device bus creates 3 physical objects corresponding to the 3 card holders respectively.

Step 105: the operating system of the host installs and loads a smart card function driver for the created physical device object; each smart card function driver registers a standard smart card driver library;

Thereby, the operating system installs a corresponding type of smart card device function driver (smart card function driver) for each card holder which is corresponding to a physical device object; and every smart card driver registers a standard smart card driver library.

In the present embodiment, the operating system of the host installs and loads three smart card function drivers, namely, the smart card function driver of the type C, type C and type S, which are corresponding to three card holders of the card reader respectively.

It should be noted that, the smart card driver library provides a standard frame for the smart card function driver and the service controller of the smart card service to perform interaction. In the present embodiment of the invention, the smart card driver libraries corresponding to three smart card function drivers are same.

It should be noted that the smart card service may includes a service controller, a resource manager and a database. Thereby, the service controller is adapted to manage smart card service, receive the request from the smart card function driver and manages resource manager; the resource manager is adapted to add new smart card device record or delete the existed smart card device record, etc, to the database.

Step 106: adding new smart card device record to the smart card service of the host;

Thereby, the smart card service creates new smart card device record in the resource manager of the smart card service according to the smart card function driver loaded and the smart card driver library registered. In the present embodiment of the invention, three smart card device records, which are corresponding to the three card holders of the card reader respectively, are created in the resource manager of the smart card service. Therefore, three smart card devices appear in the host and the host can perform operation on every smart card device individually and send or receive smart card operating instruction to or from the smart card device via the card reader device bus.

Till step 106: the card reader with multiple card holders is identified as a plurality of smart card devices by the host.

The following process is of monitoring the status of every card holder of the card reader which is identified as a plurality of smart card devices.

It should be noted that the status of every card holders of the card reader includes but not limited to be having no card, having card and power off, having card and power on. Thereby, after that the card reader with multiple card holders is identified as a plurality of smart card devices, if no IC card is inserted in the card holder of the card reader, the card holder is in the status of having no card; if an IC card is inserted in the card holder and the host does not send the instruction of power on or the host sent the instruction of power off, the card holder is in the status of having card and power off; if the IC card is inserted in the card holder, the host sends instruction of power on and the card responds to the instruction and returns Answer To Reset (ATR) successfully as well, the card holder is in the status of power on.

Step 107: the card reader device bus driver sends interrupt request to the card reader via the interrupt transfer channel;

It should be noted that the card reader device bus driver and the card reader may perform communication via two communication channels: bulk transfer channel and interrupt transfer channel.

Thereby, the bulk transfer channel adapted to data transfer, such as instruction of power on or power off, or other smart card operating instructions. The host and the card reader perform data communication via the bulk transfer channel according to one-request-one-response way; the interrupt channel is used to transfer asynchronous cases, such as card inserting, card removing or short circuit happens in card, etc., and the card reader will send signal to the host via the interrupt transfer channel.

Thereby, in the present embodiment of the invention, if no card is inserted in or removed from the card holder of the card reader, the interrupt request is suspended.

Step 108: the card reader device bus driver receives interrupt signal returned from smart card device.

When a card is inserted in a card holder of the card reader, the card reader will send interrupt signal indicating that a card is inserted in the card reader device bus driver via the interrupt transfer channel. Still taking the example for that the card holder has three card holders, the specific interrupt signal can be the following:

a card is inserted in the No. 1 card holder 0x5003
a card is inserted in the No. 2 card holder 0x500c
a card is inserted in the No. 3 card holder 0x5030

Correspondingly, in the process of using the card reader, if a card is removed from a card holder, the card holder will send interrupt signal indicating that the card is removed from the card reader to device bus driver via the interrupt transfer channel. Specifically, the interrupt signal can be the following:

a card is removed from the No. 1 card holder 0x5002
a card is removed from the No. 2 card holder 0x5008
a card is removed from the No. 2 card holder 0x5020

Step 109: the card reader device bus driver parses the received interrupt signal and sends the interrupt type to the corresponding smart card function driver;

Thereby, the card reader device bus driver parses the interrupt signal to confirm the interrupt type corresponding to the signal, the smart card device and the smart card function driver, and updates the sub-device status list in the card reader device bus driver and mapping the change of the status of the card holder of the card reader via the sub-device status list to the smart card function driver.

Thereby, it should be noted that the card reader device bus driver will create a sub-device status list recording the status of the card holders of the card reader, including status of having card or having no card, after that the smart card device is created successfully by the card reader device bus driver.

For example, if the sub-device status list of the card reader device bus driver recorded that the status of the No. 1 card holder is having no card and the card reader device bus driver will receive the interrupt signal of 0x5003, the card reader device bus driver will modify the status of the No. 1 card holder to be having card in the sub-device status list and map the status to the smart card function driver 1.

Step 110: the smart card function driver reports the change of the status of the card holder to the smart card service via the smart card driver library;

Specifically, the smart card function driver 1 modifies the references in the smart card status tracking I/O request packet in the smart card driver library1, which indicates the status of the smart card, to be having card, via the function (SmartcardExtension→ReaderFunction[RDF_CARD_TRACKING]=RockeyCardTracking;), and sends the smart card status tracking I/O request packet to the service controller of the smart card service, the service controller reports to the upper layer application that a card is inserted in the smart card device, meanwhile, the resource manager modifies the smart card device status to be having card and updates the record of the database.

The embodiment provides a method for recognizing a card reader with multiple card holders, by which the card reader with multiple card holders can be identified as a plurality of smart card devices, and the host may monitor status changes of every card of the smart card device and the card reader with multiple card holders may supports the situation that a card reader with card holders of same type or different types, and make the plural of card holders of the card reader share one communication bus and the plural card holders of the card reader can perform data communication and sending/receiving instruction by using one communication channel alternatively or mutual exclusively.

The embodiment further provides a communication method between a host and a card reader with multiple card holders based on the recognizing method above. The card reader device bus driver reports to the upper application that a card is in the card reader and the upper application can send instruction to the specified card holder of the card reader via the card reader bus driver as needed and perform operations such as power on. Protocol and Parameter Select (PPS), reading and writing data, etc.

It should be noted that the service controller of the smart card service further adapted to receive request from upper application, call the function DeviceIOControl according to the received request and specify the detailed operation in the parameters of the function.

For example, in the function DeviceIOControl, the value of parameter dwIoCotrolCode indicates the type of operation. The smart card driver library parses the operation requested by the function DeviceIOControl and then the smart card function driver generates a smart card operating instruction complied with CCID protocol according to the result parsed by the smart card driver library.

Thereby, the parameters for calling provided by the DeviceIOControl include the following parameters besides dwIoControlCode:

```
BOOL DeviceIoControl(
   HANDLE hDevice,                  // handle to device
   DWORD dwIoControlCode,           // operation
   LPVOID lpInBuffer,               // input data buffer
   DWORD nInBufferSize,             // size of input data buffer
   LPVOID lpOutBuffer,              // output data buffer
   DWORD nOutBufferSize,            // size of output data buffer
   LPDWORD lpBytesReturned,         // byte count
   LPOVERLAPPED lpOverlapped        // overlapped information
);
```

The smart card driver library is adapted to provide a standard frame for the interaction between the smart card function driver and the service controller of the smart card service; the smart card driver library parses DeviceIOControl and then dispatch the following four functions to the smart card function driver:

SmartcardExtension→ReaderFunction[RDF_CARD_POWER]=RockeyCardPower;
SmartcardExtension→ReaderFunction[RDF_TRANSMIT]=RockeyTransmit;
SmartcardExtension→ReaderFunction[RDF_CARD_TRACKING]=RockeyCardTracking;
SmartcardExtension→ReaderFunction[RDF_SET_PROTOCOL]=RockeySetProtocol;

The smart card function driver create instructions according to the four functions to control the smart card device to perform operations such as power on/power off, data transfer, tracking card status and setting up protocol, etc.; correspondingly, the smart card function driver returns information to the smart card driver library by the four functions above and the smart card driver library reports to the smart card service and the upper application via DeviceIOControl.

Figure 2:
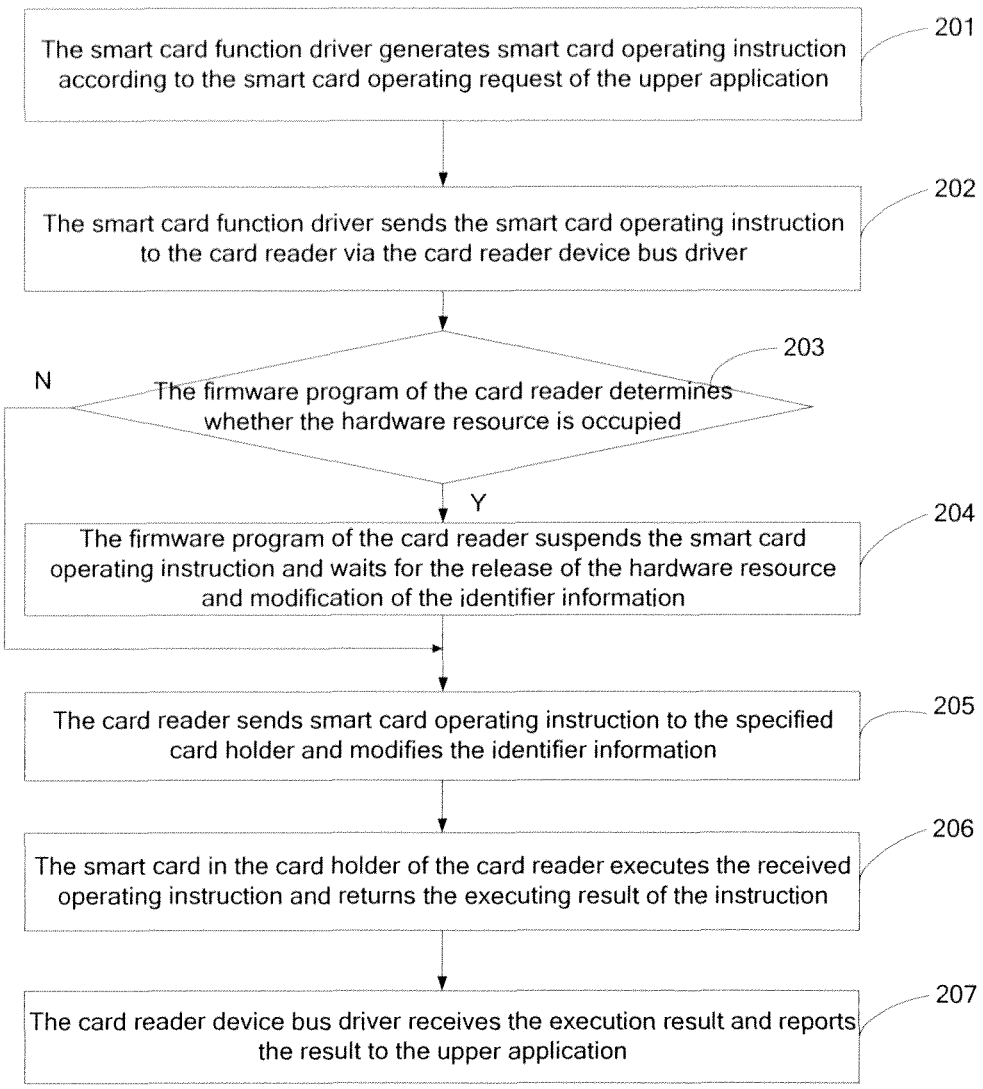
FIG. 2 is a flow chart illustrating a method for communicating between a host and a card reader with multiple card holders provided by Embodiment 1.

Referring to FIG. 2, the method includes:

Step 201: the smart card function driver generates smart card operating instruction according to the smart card operating request of the upper application;

Thereby, the operating on the smart card by the upper application is that the upper application sends operating request to the service manager of the smart card service; according to the request of the upper application, the service manager calls the function DeviceIOControl and specifies detailed operation in the function parameters, the smart card driver library parses the function and then dispatches function to the smart card function driver, the smart card function driver encloses the received data to be the smart card operating instruction complied with CCID protocol; the sixth byte in the smart card instruction indicates the No. of the card holder corresponding to the smart card function driver. For example, the upper application generates operating request for obtaining random number from the smart card device 1; the smart card function driver 1 receives data 0x00 84 00 00 08 transferred by the function (SmartcardExtension→ReaderFunction[RDF_TRANSMIT] RockeyTransmit;); the smart card function driver 1 encloses the received data by using the instruction head of the CCID standard 0x6f 05 00 00 00 00 10 00 00 00 and gets the smart card operating instruction 0x6f 05 00 00 00 00 10 00 00 00 00 84 00 00 08 which indicates the No. 1 card holder;

Furthermore, for example, according to the parameters in the received function (Smartcard Extension→ReaderFunction[RDF_CARD_POWER]=RockeyCardPower;), the smart card function driver 2 determines to perform operation of power on or power off on the No. 2 card holder, e.g. parameter 0x00 indicates power on and parameter 0xFF indicates power off; or parameter 0xaa indicates power on and parameter 0x55 indicates power off; if the smart card function driver 2 determines of performing power on operation on the No. 2 card holder, the smart card function driver 2 generates power on instruction complied with CCID protocol, e.g. 0x62 00 00 00 00 01 21 01 00 00, which indicates the power on instruction of No. 2 card holder; thereby, the sixth byte 01 indicates the No. 2 card holder. Correspondingly, the smart card function driver uses the following function to notify the status of the inserting or removing the card to the smart card service via the smart card driver library: (Smartcardextension→Readerfunction[RDF_CARD_TRACKING]=RockcyCardTracking:)

Furthermore, the smart card function driver parses the ATR information returned by the card after powered on and uses the following function to notify the smart card service that the communication mode of the card complies with t0 or t1 protocol via the smart card driver library: (SmartcardExtension→ReaderFunction[RDF_SET_PROTOCOL]=RockeySetProtocol;).

Step 202: the smart card function driver sends the smart card operating instruction to the card reader via the card reader device bus driver;

Step 203: the firmware program of the card reader determines whether the hardware resource is occupied;

If the hardware resource is occupied, goes to step 204;

If the hardware resource is not occupied, goes to step 205;

Thereby, it should be noted that take the example for that the chip of the card reader time-sharing controls three card holders, at a time, only one card holder connects card reader device bus driver via the bulk transfer channel to perform data communication. The firmware program of the chip obtains the cardholder No. corresponding to the smart card operating instruction according to the card reader status, switches the channel according to the card holder No. field in the smart card operating instruction, sends the smart card operating instruction to the specified card holder and modifies the identifier information to indicate the occupying of the card reader hardware resource.

Thereby, the identifier information specifically refers to the identifier information which indicates that the card reader hardware resource is occupied or free and saved by using one byte size in the register of the card reader. For example, if the card reader resource is occupied, the identifier information is modified to be 0x01; if the card reader resource is free, the identifier information is modified to be 0xff; or 0x55 indicates that the card reader resource is occupied and 0xaa indicates that the card reader resource is free.

Alternatively, the identifier information indicating that the card reader hardware resource is occupied by one card holder or free can be saved by using two bytes size in the register of the card reader. For example, if the card reader resource is occupied by No. 2 card holder, the identifier information is modified to be 0x01 00; if the card reader resource is free, the identifier information is modified to be 0x00 10; Thereby, the first byte data indicates the card holder No.; the second byte data indicates that whether the card holder is occupied or free.

Step 204: the firmware program of the card reader suspends the smart card operating instruction and waits for the release of the hardware resource and modification of the identifier information;

For example, the current status of the No. 1 card holder is powered on and the card reader device bus driver issued instruction of obtaining a random number of the No. 1 card holder 0x6f 05 00 00 00 00 10 00 00 00 00 84 00 00 08; a card is inserted in the No. 2 card holder before the card reader device bus driver obtaining the execute result of the instruction of obtaining a random number; the status of the No. 2 card holder is changed to be having card and power off from the status of having no card; the card reader sends signal 0x500c indicating that a card is inserted in the card holder via the interrupt transfer channel to the card reader bus driver; the upper application sends request of powering on when knows that No. 2 card holder has a card inserted; the smart card function driver 2 receives the request of powering on and then generates instruction of No. 2 card holder powering on 0x62 00 00 00 00 01 21 01 00 00 which complied with CCID protocol, and sends the instruction to the card reader via card reader device bus driver; because the execution of the instruction of obtaining a random number of the No. 1 card holder is not finished at present and hardware resource of card reader is occupied by smart card function driver No. 1, the card reader firmware program knows that the hardware resource is occupied by judging the identifier information and then suspends the operating instruction of No. 2 card holder; goes to Step 205 till the execution of instruction of obtaining a random number of No. 1 card holder is finished.

Step 205; the card reader sends smart card operating instruction to the specified card holder and modifies the identifier information;

Thereby, the card reader firmware program determines that the status identifier information of the current card reader is free, the card reader firmware program analyzes the received instruction to determine a card holder in the instruction and sends the instruction to this card holder, to make the card holder and the card reader device function driver performs data interaction and receiving/sending instruction in a request-response way, meanwhile, modifies the card reader status identifier information to be that the hardware resource is occupied.

Step 206: the smart card in the card holder of the card reader executes the received operating instruction and returns the executing result of the instruction;

Thereby, after finishes executing the received operating instruction, the smart card in the card reader transfers the execution result to the card reader device bus driver via the bulk transfer channel; the card holder release the hardware resource of the card reader and the card reader firmware program modifies the status identifier information of the card reader to be free as well;

After that the hardware resource of the card reader is released and the status identifier information of the card reader is modified to be free, the next instruction suspended by the card reader firmware program is sent to the corresponding card holder and the status identifier information of the card reader is modified as well.

Step 207: the card reader device bus driver receives the execution result and reports the result to the upper application.

After receives the executing result of the instruction the card reader device bus driver returns the executing result to the corresponding smart card function driver; the smart card function driver disassembles the executing result of the instruction complied with CCID instruction and sends the disassembled result to the smart card service.

For example, the executing result of the instruction of obtaining a random number of the No. 1 card holder is 0x80 0a 00 00 00 00 10 00 00 00 2111ca2b2ebb20059000; the smart card function driver takes the part that after the tenth byte in the instruction (that is 2111ca2b2ebb20059000) as the obtained random number and sends the random number to the smart card service; The No. 2 card holder executes the powering on operation and returns the ATR as 0x80 15 00 00 00 01 21 00 00 00 3bfb1300008131fe4565465307010071c68061 17d4, the smart card function driver takes the part after tenth byte in the ART (that is 3btb1300008131fe4565465307010071c6806117d4) and sends the part to the smart card service.

The present embodiment of the invention provides a method for communication between a host and a card reader with multiple card holders, which supports the case that a card reader has a different or same type of card holders. The plural of card holders of the card reader share one communication bus and the plural card holders of the card reader can perform data communication and sending/receiving instruction by using one communication channel alternatively or mutual exclusively.

Embodiment 2

Figure 3:
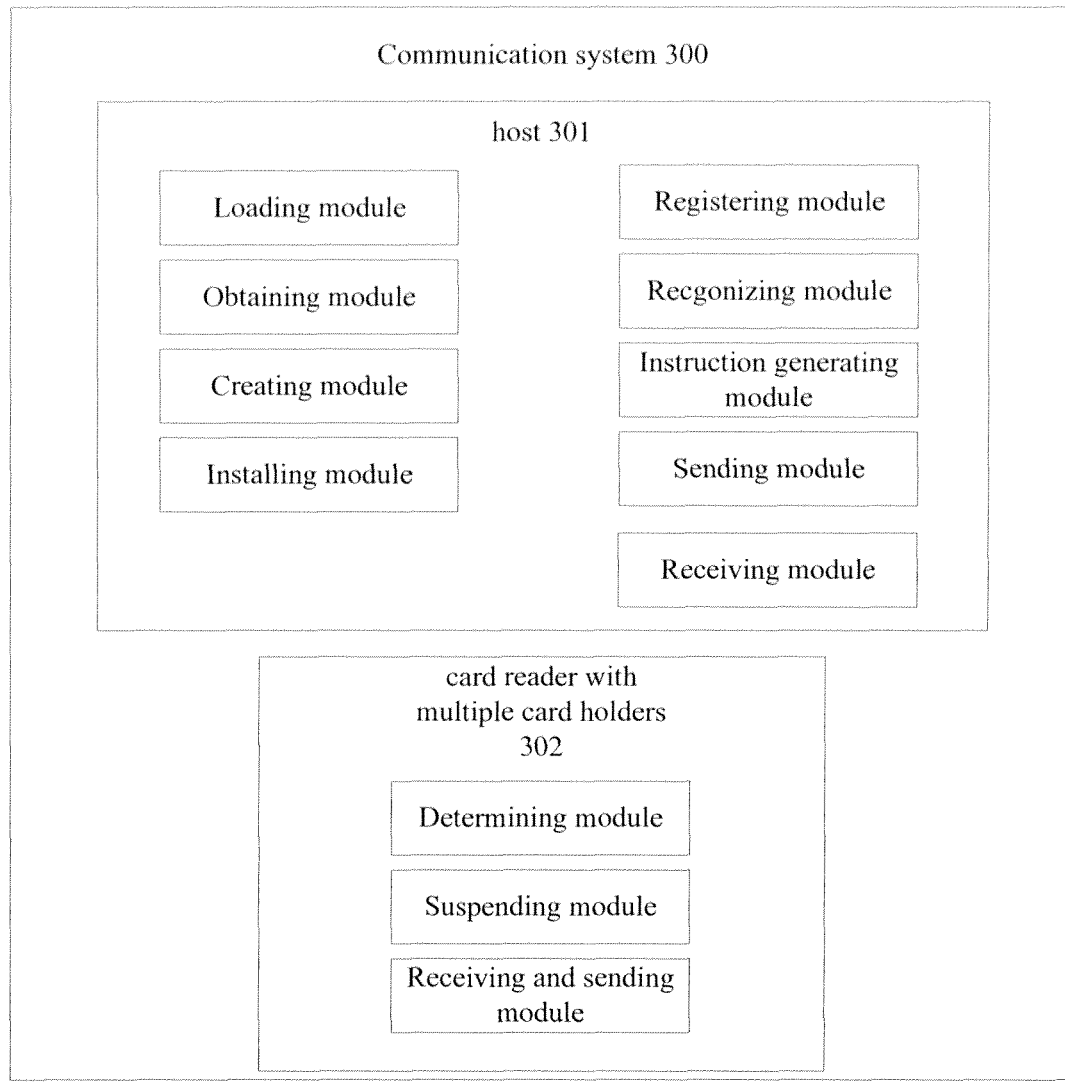
FIG. 3 is a structural diagram illustrating of a communication system provided by Embodiment 2.

Referring to FIG. 3, the embodiment of the invention provides a communication system. The communication method for the communication system can refers to the communication method provided by Embodiment 1. As shown in FIG. 3, the communication system 300 includes a host 301 and a card reader with multiple card holders 302;

The host 301 includes:
a loading module adapted to load card reader device bus driver when the card reader with multiple card holders 302 is connected to the host 301;
an obtaining module adapted to obtain device information of the card reader with multiple card holders 302 via the card reader device bus driver;
a creating module adapted to create physical device object via the card reader device bus drive according to the said device information;
an installing module adapted to install and load smart card function driver for each physical device object;
a registering module adapted to register a standard smart card driver library for every smart card function driver individually;
an recognizing module adapted to, via the smart card service of the host 301, create a new smart card device record in the resource manager of the smart card service and identify the card reader with multiple card holders 302 as a plurality of smart card devices according to the smart card function driver loaded and the smart card driver library registered.
an instruction generating module adapted to generate smart card operating instruction via the smart card function driver according to the smart card operating request sent by the host 301;
a sending module adapted to send the smart card operating instruction generated by the instruction generating module to the card reader with multiple card holders 302;
a receiving module adapted to receive executing result of the smart card operating instruction via the card reader device bus driver and reports the executing result to the upper layer application;

The card reader with multiple card holders 302 includes:
a determining module adapted to determine whether the hardware resource of the card reader 302 is occupied at present via the card reader firmware program of the card reader with multiple card holders 302;
a suspending module adapted to suspend the smart card operating instruction and wait for the release of the hardware resource if the determine module determines that the hardware resource of the current card reader 302 is occupied;
a receiving and sending module adapted to issue smart card operating instruction to the card holder in the smart card operating instruction if the determine module determines that the hardware resource of the current card reader 302 is not occupied, and receive and send to the host 301 the execute result sent by the card holder;

Furthermore, the obtaining module of the host 301 specifically includes:
a receiving unit adapted to receive inquiry request via the card reader device bus driver, which is for obtaining the device information of the card reader 302, issued by the host 301;
an obtaining unit adapted to obtain device information of the card reader 302 via the card reader bus driver according to the inquiry request.

Thereby, the obtaining unit specifically includes:
a sub-sending unit adapted to respond to the inquiry request via the card reader device bus driver, generate inquiry instruction and send the inquiry instruction to the card holder with multiple card holders 302.
a sub-returning unit adapted to receive device descriptor of the card reader with multiple card holders 302 via the card reader device bus driver and parse the descriptor and then send the parsed descriptor to the creating module.

Furthermore, the sending module of the host 301 is adapted to send interrupt request to the card reader with multiple card holders 302 via the card reader device bus driver; the receiving module of the host 301 is further adapted to receive the interrupt signal returned by the card reader with multiple card holders 302;

Correspondingly, the host 301 further includes:
an interrupt parsing module adapted to parse the interrupt signal to obtain the interrupt type, card holder and smart card function driver corresponding to the interrupt signal; an interrupt reporting module adapted to report the status, which includes having card, having card and power off, having card and power on, of the corresponding card holder of the card reader with multiple card holders 302 to the smart card service according to the interrupt type, card holder and smart card function driver corresponding to the interrupt signal obtained by the interrupt parsing module.

The card reader device bus driver and the card reader with multiple card holders 302 can perform communication via two communication channels, e.g. bulk transfer channel and interrupt transfer channel;

Correspondingly, the interrupt request and the interrupt signal are sent via the interrupt transfer channel.

Furthermore, the instruction generating module of the host 301 specifically includes:
a calling unit adapted to call the function DeviceIOControl according to the smart card request sent by the upper layer application of the host 301 via the service manager and indicates specific operation in the references of the function;
an issuing unit adapted to issue function to the smart card function driver after the smart card driver library parsed the function;
a generating unit adapted to enclose the data received via the smart card function driver to generate smart card operating instruction complied with CCID protocol, in which the sixth byte indicates the card holder No. of card reader 302 corresponding to the smart card driver.

Thereby, the receiving and sending module of the card reader with multiple card holders further is adapted to send the executing result of the instruction via the bulk transfer channel to the card reader device bus driver and release the hardware resource of the card reader with multiple card holders.

The embodiment provides a communication system, which supports the case that a card reader with multiple card holders with same type or different types. The plural card holders of the card reader share one communication bus and the plural card holders of the card reader can perform data communication and sending and receiving instruction alternatively and mutual exclusively by using the communication channel.

Embodiment 3

Figure 4:
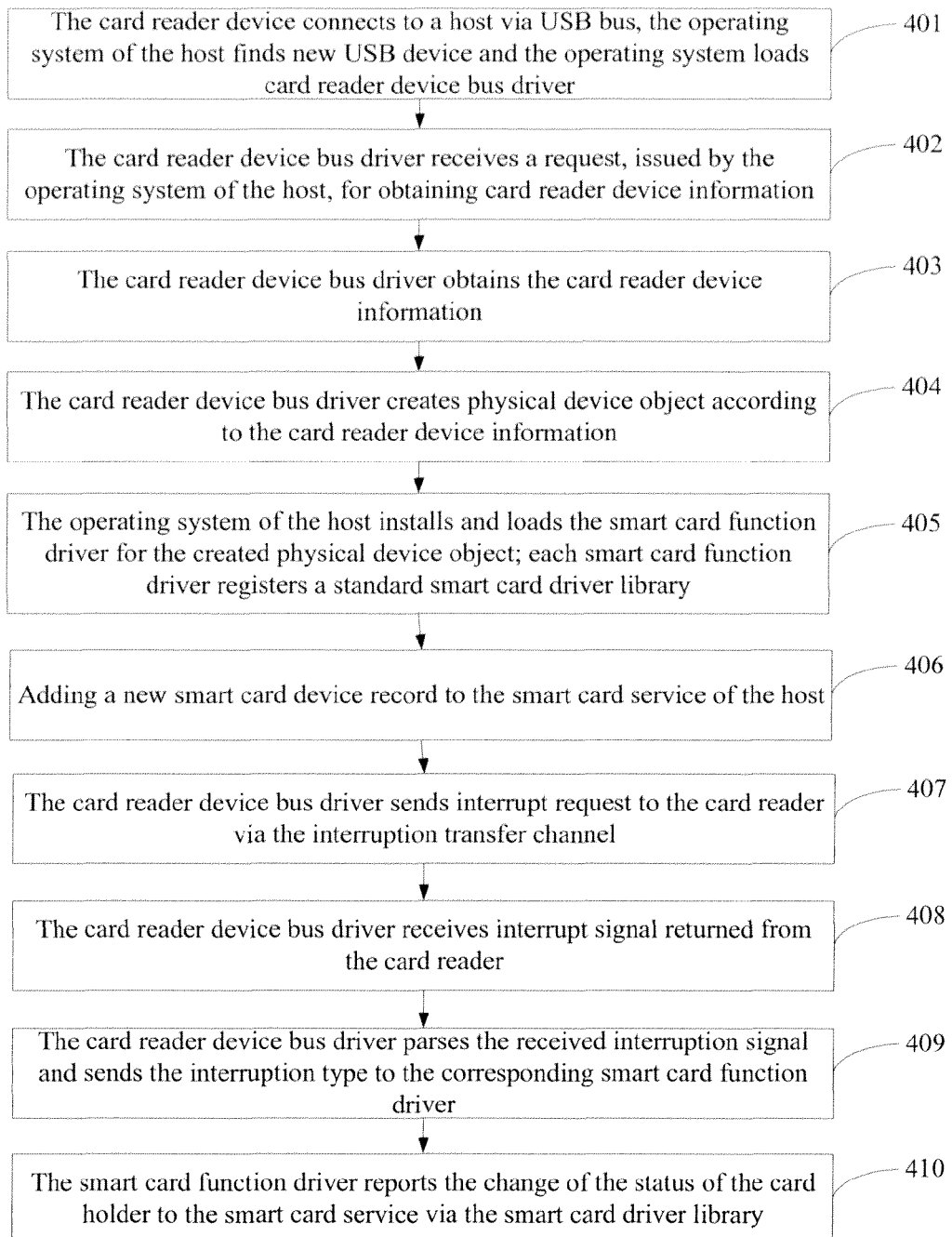
FIG. 4 is a flow chart illustrating a method for recognizing a card reader with multiple card holders provided by Embodiment 3.

Embodiment 3 provides a method for recognizing a card reader with multiple card holders. It should be noted that the IC card reader provided by the embodiment 3 has at least two card holders. Referring to FIG. 4, the method includes:

Step 401: the card reader device connects to a host via USB bus, the operating system of the host finds a new USB device and the operating system loads card reader device bus driver;

after the card reader device connects to the host, data communication and instruction sending/receiving are performed according to the USB Chip/Smart Card Interface Devices (CCID) protocol via USB bus.

Step 402: the card reader device bus driver receives a request, issued by the operating system of the host, for obtaining card reader device information;

Thereby, the operating system of the host may issue the inquiry request to the card reader device bus driver via Plug and Play Manager and for obtaining card reader device information.

Step 403: the card reader device bus driver obtains the card reader device information;

Specifically, the step may includes following steps:

(1) the card reader device bus driver responses to the inquiry request of the operating system, and generates and sends request instruction to the card reader and obtains the device descriptor of the device.

(2) in the device descriptor returned by the card reader, a single character is used to indicate the type of the card holder, that is, the number of the characters contains in the device descriptor represents the number of the card holders of the card reader;

for example, if the device descriptor returned from the card reader is A, it indicates that the card reader has only one card holder and the type of the card holder is type A; If the descriptor returned from the card reader is ABAC, it indicates that the card reader has four card holders, e.g. the type of No. 1 card holder is A type, the type of No. 2 card holder is B type, the type of No. 3 card holder is A type and the type of No. 4 card holder is C type. In the present embodiment, the descriptor returned by the card reader is CCS, it indicates that the card reader has three card holders, e.g. the type of No. 1 card holder is C type, the type of No. card holder is C type and the type of No. 3 card holder is S type.

Step 404: the card reader device bus drive creates physical device object according to the card reader device information;

After that the card reader device bus driver obtains the descriptor returned by the card reader, the card reader device bus driver creates corresponding physical device objects corresponding to the card holder of the card readers respectively according to the type and number of the card holder indicated in the descriptor.

Taking example for that the device descriptor returned from the card reader is CCS, the card reader device bus creates 3 physical objects corresponding to the 3 card holders respectively.

Step 405: the operating system of the host installs and loads the smart card function driver for the created physical device object; each smart card function driver registers a standard smart card driver library;

Thereby, the operating system installs a corresponding type of smart card device function driver (smart card function driver) for each card holder which is corresponding to a physical device object; and every smart card driver registers a standard smart card driver library.

In the present embodiment, the operating system of the host installs and loads three smart card function drivers, namely, the smart card function driver of the C type, C type and S type, which are corresponding to three card holders of the card reader respectively.

It should be noted that, the smart card driver library provides a standard frame for the smart card function driver and the service controller of the smart card service to perform interaction. In the present embodiment of the invention, the smart card driver libraries corresponding to three smart card function drivers are same.

It should be noted that the smart card service includes a service controller, a resource manager and a database. Thereby, the service controller is adapted to manage smart card service, receive the request from the smart card function driver and manage resource manager; the resource manager is adapted to add new smart card device record and delete an existed smart card device record, etc, to the database.

Step 406: adding a new smart card device record to the smart card service of the host;

Thereby, the smart card service creates a new smart card device record in the resource manager of the smart card service according to the smart card function driver loaded and the smart card driver library registered.

In the present embodiment of the invention, three smart card device records, which are corresponding to the three card holders of the card reader respectively, are created in the resource manager of the smart card service. Therefore, three smart card devices appear in the host and the host can perform operation on each smart card device individually and send or receive smart card operating instruction to or from the smart card device by the card reader device bus.

Till step 406, the card reader with multiple card holders is identified as a plurality of smart card devices by the host.

The following process is of monitoring the status of every card holder of the card reader which is identified as a plurality of smart card devices.

It should be noted that the status of every card holder of the card reader includes but not limited to be having no card, having card and power off, having card and power on. Thereby, after that the card reader with multiple card holders is identified as a plurality of smart card devices, if no IC card is inserted in the card holder of the card reader, the card holders is in the status of having no card; if an IC card is inserted in the card holder and the host does not send the instruction of power on or the host sent the instruction of power off, the card holder is in the status of having card and power off; if the IC card is inserted in the card holder, the host sends instruction of power on and the card responds to the instruction and returns Answer To Reset (ATR) as well, the card holder is in the status of power on.

Step 407: the card reader device bus driver sends interrupt request to the card reader via the interrupt transfer channel;

It should be noted that the card reader device bus driver and the card reader may perform communication via two communication channels: bulk transfer channel and interrupt transfer channel.

Thereby, the bulk transfer channel adapted to transfer data, such as power on or power off instruction or other smart card operating instructions. The host and the card reader perform data communication via the bulk transfer channel according to a request-response way; the interrupt channel is used for asynchronous transfer cases, such as card inserting, card removing or short circuit happens in card, and the card reader will send signal to the host via the interrupt transfer channel.

Thereby, in the present embodiment of the invention, if no card is inserted in or removed from the card holder of the card reader, the interrupt request is suspended.

Step 408: the card reader device bus driver receives interrupt signal returned from the card reader.

When a card is inserted in a card holder of the card reader, the card reader will send interrupt signal indicated that a card is inserted in the card reader device bus driver via the interrupt transfer channel. Still taking the example for that the card holder has three card holders, the specific interrupt signal can be the following
 a card is inserted into the No. 1 card holder 0x5003
 a card is inserted into the No. 2 card holder 0x500c
 a card is inserted into the No. 3 card holder 0x5030
Correspondingly, in the process of using the card reader, if a card is removed from a card holder, the card holder will send interrupt signal indicated that the card is removed from the card reader device bus driver via the interrupt transfer channel. Specifically, the interrupt signal can be the following
 a card is removed from the No. 1 card holder 0x5002
 a card is removed from the No. 2 card holder 0x5008
 a card is removed from the No. 2 card holder 0x5020

Step 409: the card reader device bus driver parses the received interrupt signal and sends the interrupt type to the corresponding smart card function driver;

Thereby, the smart card device bus driver parses the interrupt signal to obtain the interrupt type, the smart card device and the smart card function driver corresponding to the signal and updates the sub-device status list in the card reader device bus driver and mapping the change of the status of the card holder of the card reader via the sub-device status list to the smart card function driver.

Thereby, it should be noted that the card reader device bus driver will create a sub-device status list recording the status of the card holders of the card reader, including status of having card or having no card, after that the smart card device is created successfully by the card reader device bus driver.

For example, if the sub-device status list of the card reader device bus driver recorded that the status of the No. 1 card holder is having no card and the card reader device bus driver receives the interrupt signal 0x5003, the card reader device bus driver will modify the status of the No. 1 card holder to be having card in the sub-device status list and map the status to the smart card function driver 1.

Step 410: the smart card function driver reports the change of the status of the card holder to the smart card service via the smart card driver library; Specifically, the smart card function driver 1 modifies the references in the smart card status tracking I/O request packet in the smart card driver library 1, which indicates the status of the smart card, to be having card via the function (SmartcardExtension→ReaderFunction[RDF_CARD_TRACKING]=RockeyCardTracking;), and sends the smart card status tracking I/O request packet to the service controller of the smart card service, the service controller reports to the upper layer application that a card is inserted in the smart card device, meanwhile, the resource manager modifies the smart card device status to be having card and updates the record of the database.

The embodiment provides a method for recognizing a card reader with multiple card holders, by which the card reader with multiple card holders can be identified as a plurality of card devices, and the host may monitor status changes of every card of the card holder and the card reader with multiple card holders may support the situation that a card reader with card holders of same type or different types, and make the plurality of card holders of the card reader share a communication bus and the plural card holders of the card reader can perform data communication and sending/receiving instruction by using one communication channel alternatively or mutual exclusively.

Embodiment 4

The embodiment further provides a communication method between a host and a card reader with multiple card holders based on the recognizing method of embodiment 3. The card reader device bus driver reports to the upper application that a card is in the card reader; the upper application can send instruction to the specified card holder of the card reader via the card reader bus driver and perform operations such as power on, Protocol and Parameter Select (PPS), reading and writing data, etc.

It should be noted that the service controller of the smart card service further is adapted to receive a request of upper application, call the function DeviceIOControl according to the received request and specify detailed operation in the parameters of the function.

For example, in the function DeviceIOControl, the value of parameter dwIoCotrolCode indicates the type of operation. The smart card driver library parses the operation requested by the function DeviceIOControl and the smart card function driver generates a smart card operating instruction complied with CCID protocol according to the result parsed by the smart card driver library.

Thereby, the parameter for calling provided by the DeviceIOControl includes the following parameters besides dwIoControlCode.

```
BOOL DeviceIoControl(
HANDLE hDevice,                 // handle to device
DWORD dwIoControlCode,          // operation
LPVOID lpInBuffer,              // input data buffer
DWORD nInBufferSize,            // size of input data buffer
LPVOID lpOutBuffer,             // output data buffer
DWORD nOutBufferSize,           // size of output data buffer
LPDWORD lpBytesReturned,        // byte count
LPOVERLAPPED lpOverlapped       // overlapped information
);
```

The smart card driver library is adapted to provide a standard frame for the communication between the smart card function driver and the service controller of the smart card service; the smart card driver library parses DeviceIOControl and then issues the following four functions to the smart card function driver:
SmartcardExtension→ReaderFunction[RDF_CARD_POWER] RockeyCardPower;
SmartcardExtension→ReaderFunction[RDF_TRANSMIT]=RockeyTransmit;
SmartcardExtension→ReaderFunction[RDF_CARD_TRACKING]=RockeyCardTracking;
SmartcardExtension→ReaderFunction[RDF_SET_PROTOCOL]=RockeySetProtocol;

The smart card function driver creates instructions according to the four functions to control the smart card device to perform operations such as power on/power off data transfer, tracking card status and setting up protocol, etc.; correspondingly, the smart card function driver returns information to the smart card driver library by the four functions above and the smart card driver library reports to the smart card service and the upper application via DeviceIOControl.

Figure 5:
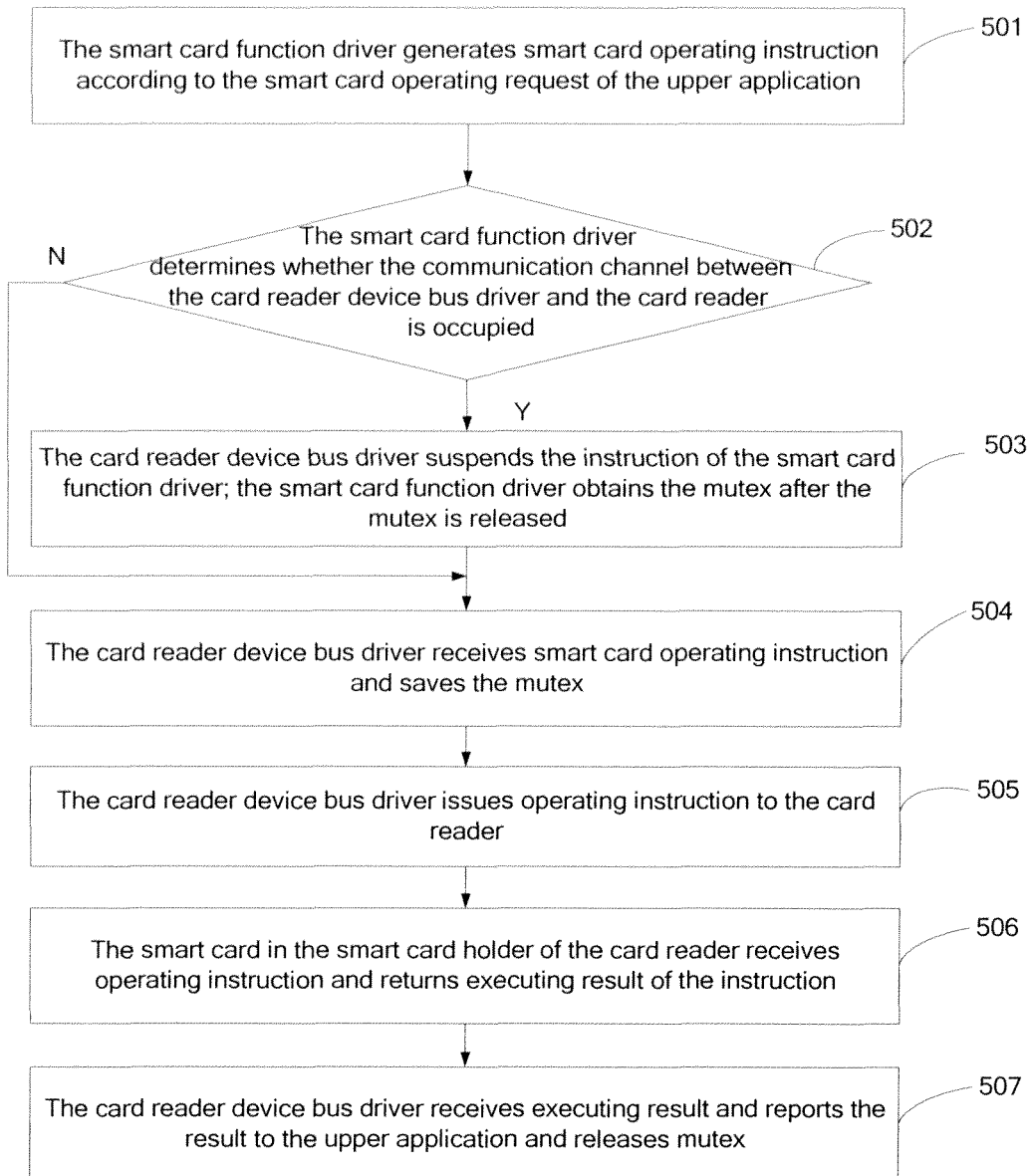
FIG. 5 is a flow chart illustrating a method for communicating between a host and a card reader with multiple card holders provided by Embodiment 4.

Referring FIG. 5, the method includes:

Step 501: the smart card function driver generates smart card operating instruction according to the smart card operating request of the upper application;

Thereby, the operation on the smart card by the upper application is that the upper application sends operating request to the service manager of the smart card service; according to the request of the upper application, the service manager calls DeviceIOControl and specifies detailed operation in the function parameters, the smart card driver library parses function and then issues function to the smart card function driver; the smart card function driver encloses the received data to be the smart card operating instruction complied with CCID protocol; the sixth byte in the smart card instruction indicates the No. of the card holder corresponding to the smart card function driver.

For example, the upper application generates operating request for obtaining a random number from the smart card device 1; the smart card function driver 1 receives data 0x00 84 00 00 08 transferred by the function (SmartcardExtension→ReaderFunction[RDF_TRANSMIT]=RockeyTransmit;); the smart card function driver 1 encloses the received data by using the instruction head of the CCID standard 0x6f 05 00 00 00 00 10 00 00 00 and gets the smart card operating instruction 0x6f 05 00 00 00 00 10 00 00 00 00 84 00 00 08, which indicates that it is the instruction of obtaining random number of the No. 1 card holder and the sixth byte 00 indicates the No. 1 card holder;

Furthermore, for example, according to the parameters in the received function (SmartcardExtension→ReaderFunction[RDF_CARD_POWER]=RockeyCardPower;), the smart card function driver 2 determines to perform power on or power off operation on the No. 2 card holder, e.g. parameter 0x00 indicates power on and parameter 0xFF indicates power off; or parameter 0xaa indicates power on and parameter 0x55 indicates power off; if the smart card function driver 2 determines of performing power on operation on No. 2 card holder, the smart card function driver 2 generates power on instruction complied by CCID protocol, e.g. 0x62 00 00 00 00 01 21 01 00 00, which indicates the power on instruction of No. card holder, thereby, the sixth byte indicates No. 2 card holder.

Correspondingly, the smart card function driver uses the following function to notify the status of the inserting or removing the card to the smart card service via the smart card driver library:
(SmartcardExtension→ReaderFunction[RDF_CARD_TRACKING]=RockeyCardTracking;)

Furthermore, the smart card function driver parses the ATR information returned by the card after powered on and uses the following function to notify the smart card service that the communication mode of the card complies with t0 or t1 protocol via the smart card driver library: (SmartcardExtension→ReaderFunction[RDF_SET_PROTOCOL]=RockeySetProtocol;).

Step 502: the smart card function driver determines whether the communication channel between the card reader device bus driver and the card reader is occupied;

If the communication channel is occupied, goes to step 503;

If the communication channel is not occupied, goes to step 504.

Thereby, it should be noted that, the chip of the card reader in the embodiment controls 3 card holders in time sharing manner. At a time, only one card holder connects with the card reader device bus driver via the bulk transfer channel to perform data communication. The firmware program of the chip switches the channel according to the card holder number field in the instruction and determines which card holder is connected with the card reader device bus driver and performs data communication and receiving and sending instruction, etc.

The method of determining whether the communication channel is occupied is that the smart card function driver generates smart card operating instruction and applies to the operating system for a mutex, which symbolizes that the smart card function driver and its corresponding card holder can exclusively occupy the card reader device bus driver communication channel. So that the smart card function driver builds communication between the card reader device bus driver and its corresponding card holder to perform data communication and receiving and sending instruction, etc.

If the obtaining of the mutex is failed, it means the communication channel has been occupied already;

If the smart card function driver can obtain the mutex successfully, it means that the communication channel is not occupied or is free.

The advantages of the way of determination above is that when the card holder and the host is connected and performs data communication, by allocating the smart card function driver corresponding to the card holder the mutex, the card holder can occupy the communication channel exclusively in the process that the card holder of the card reader and the host are performing one-request-one-response communication. At that time, the instructions of other card holders can not be issued by the card reader device bus driver. In this way, the card holder of the card reader can perform data communication and sending and receiving instruction smoothly and orderly.

Step 503: the card reader device bus driver suspends the instruction of the smart card function driver; the smart card function driver obtains the mutex after the mutex is released;

When the obtaining of the mutex is successful, goes to step 504.

For example, if the status of the current No. 1 card holder is power on, the card reader device bus driver issues instruction of obtaining a random number of the No. 1 card holder; if a card is inserted in the No. 2 card holder before that the card reader device bus driver receives the executing result of the instruction of obtaining a random number, the status of No. 2 card holder is changed from having no card to be having card and power off; the card reader sends signal 0x500c, which indicates that a card is inserted in the No. 2 card holder, to the card reader device bus driver via the interrupt transfer channel; the upper application knows that a card is inserted in the No. 2 card holder and sends a request of powering up; the smart card function driver 2 receives the request of powering up and generates an instruction of powering up No. 2 card holder, e.g. 002 00 00 00 00 01 21 01 00 00, which complied with CCID protocol and sends the instruction to the card reader device bus driver; since the execution of the random number instruction of the current No. 1 card holder has not completed yet and the mutex is occupied by the smart card function driver 1, the card reader device bus driver obtains mutex for the smart card function driver 2 unsuccessfully and suspends the instruction; when the No. 1 card holder completes the execution of instruction of obtaining a random number and the mutex is released, the card reader device bus driver will obtain the mutex again; if the mutex is obtained successfully, goes to step 504.

Step 504: the card reader device bus driver receives smart card operating instruction and saves the mutex;

the smart card function driver obtains mutex successfully and sends generated smart card operating instruction to the card reader device bus driver and saves the mutex to the card reader device bus driver; the card reader device bus driver receives the execution result of the instruction and then releases the mutex.

Step 505: the card reader device bus driver issues operating instruction to the card reader;

thereby, the card reader device bus driver receives the smart card operating instruction generated by the smart card function driver and then issues the instruction to the specified card holder via the bulk transfer channel.

Specifically, the firmware program of the card reader chip parses the received instruction, obtains the card holder indicated in the instruction, and switches the card holder indicated in the instruction to connect with the specified transfer channel of the card reader device function driver; so that the card holder and the card reader device function driver performs data interaction and sending and receiving instruction in one-request-one-response way.

Step 506: the smart card in the smart card holder of the card reader receives operating instruction and returns executing result of the instruction.

Thereby, the smart card in the card reader holder finishes the execution of the received operating instruction and then sends the execution result to the card reader device bus driver via the bulk transfer channel and the card holder releases the hardware resource of the card reader.

Step 507: the card reader device bus driver receives executing result and reports the result to the upper application and releases mutex.

The card reader device bus driver receives the executing result and the mutex is released; the card reader device bus driver returns the result to the corresponding smart card function driver and the smart card function driver disassembles the executing result of instruction of the CCID protocol and sends the disassembled result to the smart card service.

For example, the executing result of the random number instruction of the No. 1 card holder is 0x800a 00 00 00 00 10 00 00 00 2111 ca2b2ebb20059000; the smart card function driver takes the part after the tenth byte in the instruction, e.g. 2111ca2b2ebb20059000, as the obtained random number and transfers the random number to the smart card service; the No. 2 card holder finishes the operation of powering on and then returns the ATR, e.g. 0x80 15 00 00 00 01 21 00 00 00 3btb1300008131fe4565465307010071c6806117d4; the smart card function driver takes the part after the tenth byte in the ATR, e.g. 0x3btb1300008131fe4565465307010071c6806117d4, and transfers the part to the smart card service.

At the time of releasing the mutex, the smart card function driver whose instruction is suspended by the card reader bus driver obtains the mutex successfully and the card reader device bus driver receives the instruction and issues the instruction to the card reader; the firmware program of the card reader switches the communication channel to the specified card holder; the card reader device bus driver and the card holder performs data communication and sending and receiving instruction in the one-request-one-response way.

The embodiment of the invention provides a method for communication between the host and the card reader with multiple card holders, which supports the condition that a card reader has a same type or different types of card holders. The multiple card holders of the card reader share a communication bus and the card holders of the card reader can perform data communication and sending and receiving instruction alternatively or mutual exclusively.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for recognizing a card reader with multiple card readers, wherein the method comprising:
    connecting, by the card reader with multiple card holders, to a host and loading, by the host, a card reader device bus driver;
    obtaining, by the card reader device bus driver, device information of the card reader with multiple card holders and creating a physical device object according to the device information;
    installing and loading, by the host, a smart card function driver for each physical device object and registering a standard smart card driver library for each smart card function driver;
    creating, by a smart card service of the host, a new smart card device record in the resource manager of the smart card service according to the smart card function driver loaded and the smart card driver library registered and recognizing the card reader with multiple card holders as a plurality of smart card devices,
    wherein the method further comprising:
    generating, by the smart card function driver, a smart card operating instruction according to the smart card operating request sent from an upper application;
    applying, by the smart card function driver, for a mutex;
    if the mutex application is not successful, suspending the smart card operating instruction and waiting for a successful application;
    if the mutex application is successful, sending, by the smart card function driver, the smart card operating instruction to the card reader device bus driver; issued by the card reader device bus driver, the smart card operating instruction to the card reader with multiple card holders; executing, by a corresponding smart card in a card holder of the card reader with multiple card holders, the smart card operating instruction received and returning the executing result; receiving, by the card reader device bus driver, the executing result and reporting the result to the upper application and releasing the mutex; generating, by the smart card function driver, a smart card operating instruction according to the smart card operating request sent from the host and sending the smart card operating instruction to the card reader with multiple card holders via the smart card device bus driver;
    determining, by the firmware program of the card reader, whether the hardware resource of the card reader is occupied at present;
    if it is occupied, suspending the smart card operating instruction and waiting for the releasing of the hardware resource;
    if it is not occupied, issued by the card reader, the smart card operating instruction to the corresponding card holder; executing, by the smart card in the corresponding card holder, the smart card operating instruction and returning the executing result; receiving, by the card reader bus driver, the executing result and reporting the executing result to the upper application.

2. The method of claim 1, wherein obtaining, by the card reader device bus driver, device information of the card reader with multiple card holders and creating a physical device object according to the device information in particular comprises:
    receiving, by the card reader device bus driver, an inquiry request for obtaining card reader device information issued by the host;
    obtaining, by the card reader device bus driver, the card reader device information according to the inquiry request;
    creating, by the card reader device bus driver, the physical device object according to the card reader device information obtained.

3. The method of claim 2, wherein the host issues the inquiry request to the card reader device bus driver via a Plug and Play Manager.

4. The method of claim 2, wherein obtaining, by the card reader device bus driver, the card reader device information in particular comprises:
   responding, by the card reader device bus driver, the inquiry request, generating an inquiry instruction, and sending the inquiry instruction to the card reader with multiple card holders;
   obtaining, by the card reader with multiple card holders, a device descriptor and returning the device descriptor to the card reader device bus driver.

5. The method of claim 4, wherein the single character in the device descriptor is used to indicate the type of the card holder.

6. The method of claim 1, wherein the number of the physical objects is same as the number of the card holders of the card reader with multiple card holders.

7. The method of claim 1, wherein, after the card reader with multiple card holders is identified as a plurality of smart card devices, the method further comprises:
   sending, by the card reader device bus driver, interrupt request to each smart card device, and receiving the interrupt signal returned from each smart card device;
   parsing, by the card reader device bus driver, the interrupt signal, and transferring the interrupt type parsed out from the signal to the smart card function driver of the corresponding smart card device;
   reporting, by the smart card function driver of each smart card device, the status of the corresponding card holder to the smart card service; wherein the status of the card holder includes having card, having card and powered off, having card and powered on.

8. The method of claim 7, wherein the card reader device bus driver can communicate with the card reader with multiple card holders via two communication channels: a bulk transfer channel and an interrupt transfer channel, correspondingly, the interrupt request is transferred via the interrupt transfer channel.

9. The method of claim 7, wherein the step of parsing the interrupt signal and transferring the interrupt type parsed out from the signal to the smart card function driver of the corresponding smart card device in particular comprises:
   parsing, by the card reader device bus driver, the interrupt signal to obtain the interrupt type corresponding to the interrupt signal, the smart card device and the smart card function driver;
   updating the sub-device status list of the card reader device bus driver; the sub-device status list is adapted to record the status of each card holder of the card reader with multiple card holders;
   mapping the status of each card holders of the card reader with multiple card holders to the smart card function driver via the sub-device status list.

10. The method of claim 1, wherein the step of generating, by the smart card function driver, a smart card operating instruction according to the smart card operating request sent from the upper application in particular comprises:
    calling, by the service manager, the function DeviceIOControl according to smart card request sent by the upper application of the host and indicating the specific operating in the parameters of the function;
    parsing, by the smart card driver library, the function and then allocating a function to the smart card function driver;
    enclosing, by the smart card function driver, the received data to be smart card operating instruction complied with CCID protocol; the sixth byte in the smart card operating instruction indicates the No. of the card holder of the card reader corresponding to the smart card function driver.

11. The method of the claim 1, wherein the smart card of the card holder of the card reader with multiple card holders completes the execution of the received operating instruction and then sends the executing result of the instruction to the smart card device bus driver via the bulk transfer channel and releases the hardware resource of the card reader with multiple card holders.

12. The method of the claim 1, wherein as the mutex is released, the smart card function driver of the next instruction which is suspended by the smart card device bus driver obtains the mutex successfully.

13. A communication system, wherein the system includes a host and a card reader with multiple card holders;
    the host includes:
    a loading module adapted to load card reader device bus driver when the card reader with multiple card holders is connected to the host;
    an obtaining module adapted to obtain device information of the card reader with multiple card holders via a card reader device bus driver;
    a creating module adapted to create physical device object via the card reader device bus drive according to the device information;
    an installing module adapted to install and load smart card function driver for each physical device object;
    a registering module adapted to register a standard smart card driver library for each smart card function driver;
    an recognizing module adapted to, via the smart card service of the host, create a new smart card device record in the resource manager of the smart card service and identify the card reader with multiple card holders as a plurality of smart card devices according to the smart card function driver loaded and the smart card driver library registered;
    an instruction generating module adapted to generate smart card operating instruction via the smart card function driver according to the smart card operating request sent by the host;
    a sending module adapted to send the smart card operating instruction to the card reader with multiple card holders via the smart card function driver; and
    a receiving module adapted to receive the executing result of the smart card operating instruction via the card reader device bus driver and reports the executing result to an upper layer application,
    the card reader with multiple card holders includes:
    a determining module adapted to determine whether the hardware resource of the card reader is occupied at present via the card reader firmware program of the card reader with multiple card holders;
    a suspending module adapted to suspend the smart card operating instruction and wait for the release of the hardware resource when the determine module determines that the hardware resource of the current card reader is occupied; and
    a receiving and sending module adapted to issue, by the card reader, the smart card operating instruction to the card holder in the operating instruction of the smart card when the determining module determines that the hardware resource of the current card reader is not occupied.

14. The system of the claim 13, wherein the obtaining module of the host in particular includes:
- a receiving unit adapted to receive inquiry request issued by the host, which is for obtaining the device information of the card reader, via the card reader device bus driver; and
- an obtaining unit adapted to obtain device information of the card reader via the card reader bus driver according to the inquiry request.

15. The system of claim 13, wherein the sending module of the host is further adapted to send interrupt request to the card reader with multiple card holders via the card reader device bus driver; the receiving module of the host is further adapted to receive the interrupt signal returned by the card reader with multiple card holders;

correspondingly, the host further includes:
- an interrupt parsing module adapted to parse the interrupt signal to obtain the corresponding interrupt type, card holder and smart card function driver;
- an interrupt reporting module adapted to report the status of the corresponding card holder of the card reader with multiple card holders to the smart card service according to the interrupt type, card holder and smart card function driver obtained by the interrupt parsing module, wherein the status of the card holder includes having no card, having card with power off and having card with power on.

16. The system of claim 15, wherein the card reader device bus driver and the card reader with multiple card holders can perform communication via two communication channels: a bulk transfer channel and an interrupt transfer channel;
correspondingly, the interrupt request and the interrupt signal are sent via the interrupt transfer channel.

17. The system of claim 13, wherein the instruction generating module of the host includes:
- a calling unit adapted to call the function DeviceIOControl according to the smart card request sent by the upper layer application of the host via the service manager and indicates specific operation in the references of the function;
- an issuing unit adapted to dispatch function to the smart card function driver after the smart card driver library parsed the function;
- a generating unit adapted to enclose the data received via the smart card function driver to generate a smart card operating instruction, in which the sixth byte indicates the card holder No. of card reader corresponding to the smart card driver, complied with CCID protocol.

18. The system of claim 13, wherein the receiving and sending module of the card reader with multiple card holders is further adapted to send the executing result of the instruction via the bulk transfer channel to the card reader device bus driver and release the hardware resource of the card reader with multiple card holders.

* * * * *